No. 794,393.

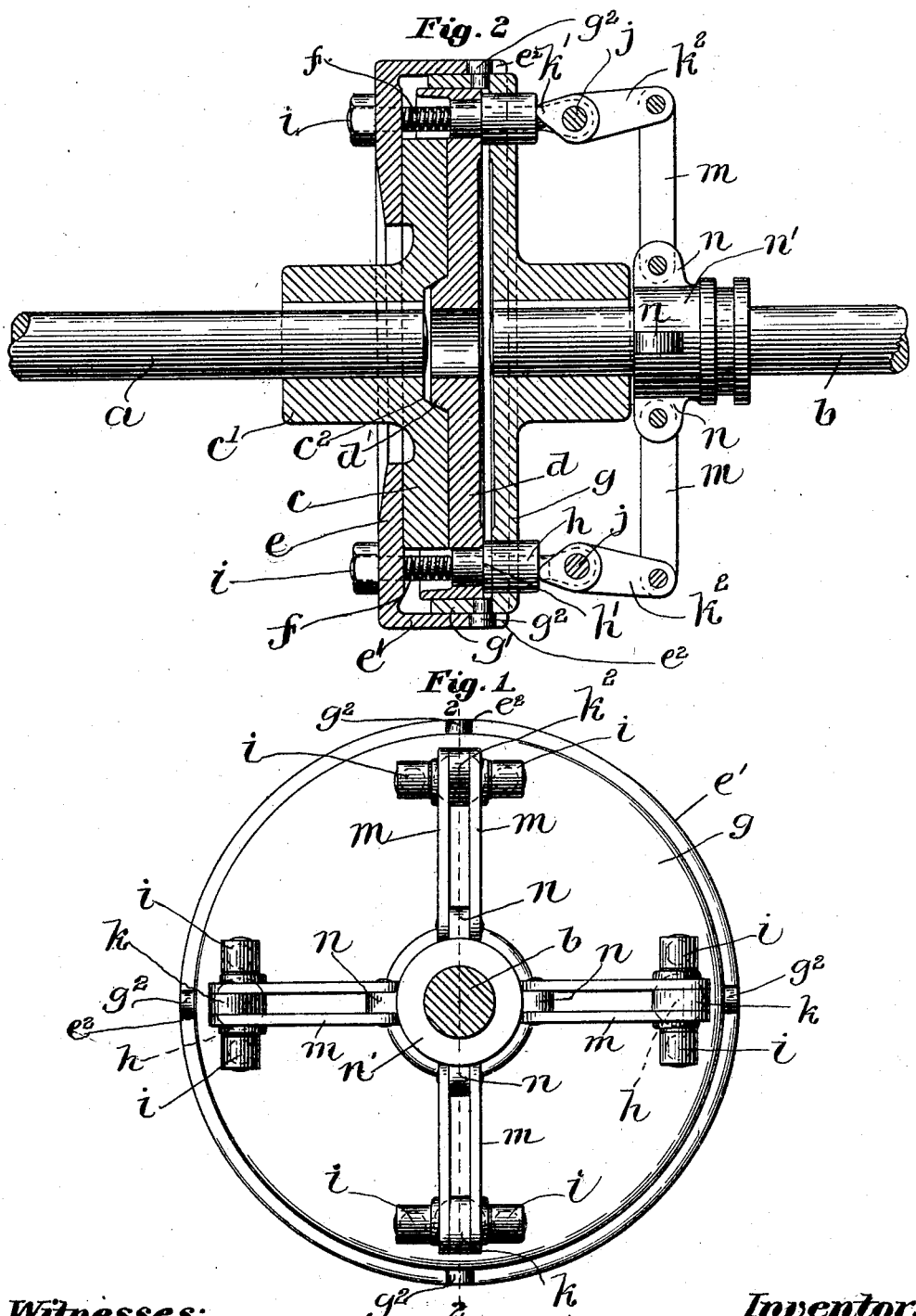

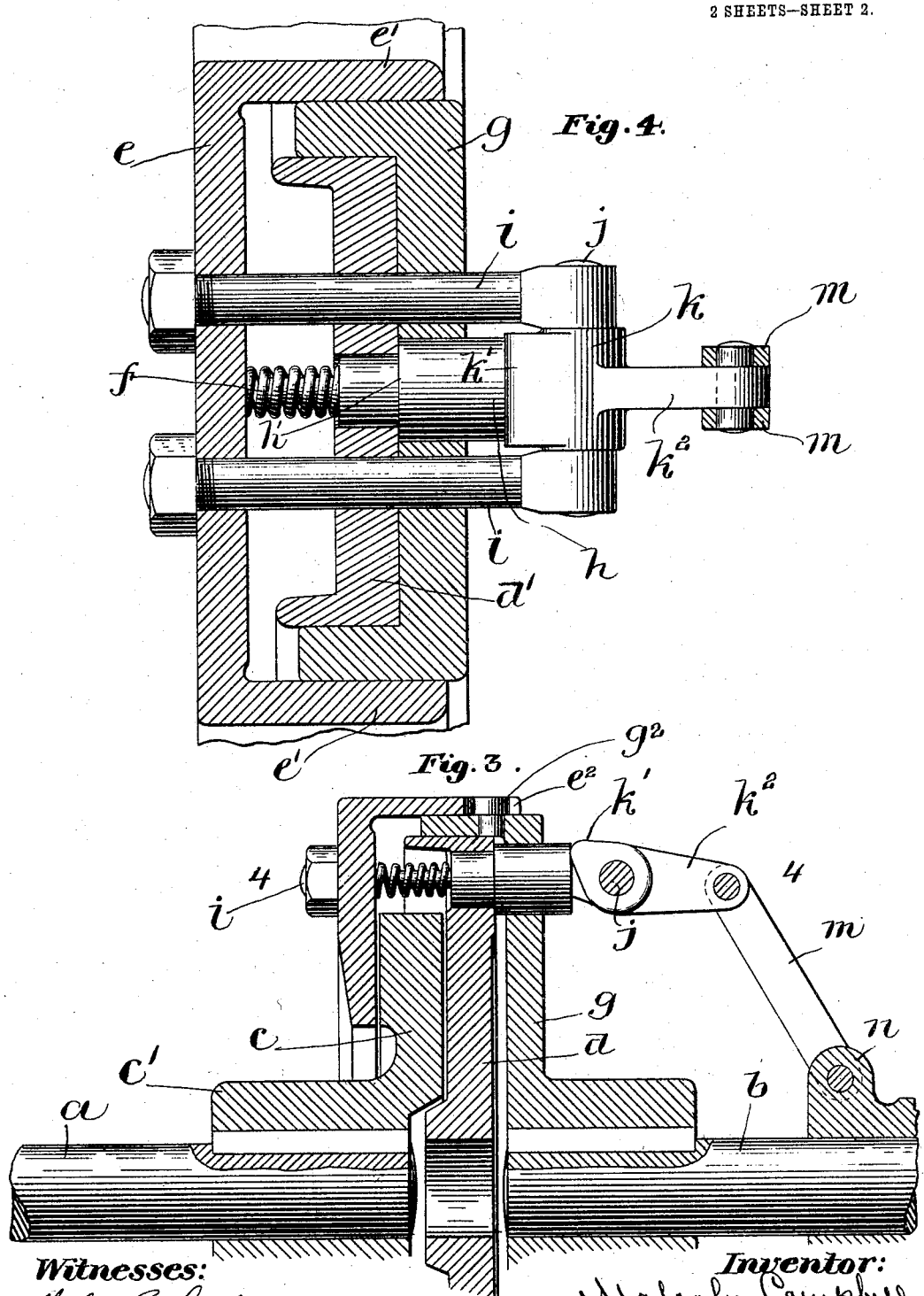

Patented July 11, 1905.

UNITED STATES PATENT OFFICE.

MALCOLM CAMPBELL, OF BOSTON, MASSACHUSETTS.

FRICTION CLUTCH MECHANISM.

SPECIFICATION forming part of Letters Patent No. 794,393, dated July 11, 1905.

Application filed June 14, 1900. Serial No. 20,298.

*To all whom it may concern:*

Be it known that I, MALCOLM CAMPBELL, a citizen of the United States, and a resident of Boston, in the county of Suffolk and State of Massachusetts, have invented certain new and useful Improvements in Friction Clutch Mechanism, of which the following is a specification.

This invention has relation to friction clutch mechanisms of the class wherein confronting members are drawn into frictional engagement.

The object of the invention is to provide a clutch mechanism of the type specified wherein provision is made for effecting a complete disengagement of the controlling friction members when it is desired to uncouple the driving and driven parts.

To this end the invention consists of a clutch mechanism having certain features of construction and relative arrangement of parts, as illustrated upon the accompanying drawings, described in the following specification, and set forth in the appended claims.

Referring to the said drawings, Figure 1 represents in front elevation a clutch mechanism embodying the invention. Fig. 2 represents a longitudinal section through the same on the line 2 2 of Fig. 1. Fig. 3 represents an enlarged section on the same line. Fig. 4 represents a section on the line 4 4 of Fig. 3.

As illustrated on the said drawings, the present invention is employed for coupling two shafts, which I denominate the "driving" and the "driven" shafts; but it will be understood that the invention may be employed for coupling a shaft to a pulley or two pulleys together.

$a$ indicates the driving-shaft, and $b$ the driven shaft. To the driving-shaft is rigidly keyed a friction member $c$, consisting of a disk having a hub $c'$. $d$ represents a friction member confronting that at $c$ and movable relatively thereto. It is connected to the shaft $b$ to rotate therewith, but is movable axially relatively thereto. The member $d$ is likewise disk-shaped, and it has a frusto-conical annular boss $d'$, adapted to enter a tapering socket $c^2$ in the member $c$ for alining the two shafts when coupled together. The members $c$ and $d$ have flat faces which may be frictionally engaged, and in addition the member $d$ is equipped with an auxiliary member $e$ in the shape of a ring adapted to make contact with the other face of the member $c$. The members $d$ and $e$ are connected to rotate together by means which will be subsequently described, and they are held yieldingly apart by springs $f$ placed between them.

Rigidly secured to the end of the shaft $b$ is a carrier $g$, which is disk-shaped and has a flanged rim $g'$, over which laps a flanged rim $e'$ on the ring or member $e$. Studs $g^2$ are inserted radially in the rim $g'$ and are passed through slots $e^2$, formed in the rim $e'$, whereby the ring $e$ is adapted to move axially relatively to the carrier $g$. Studs $h$ are passed loosely through apertures in the carrier $g$ and have reduced portions forced into apertures in the member $d$ and rigidly connected to the latter, said studs having shoulders $h'$, which bear against the outer face of the said member $d$. Said studs are provided at their ends with pins around which the springs $f$ are encircled.

Bolts $i$ $i$ are passed through the carrier $g$, the member $d$, and the supplemental member $e$ to connect them all loosely together, said bolts, however, preventing any rotative movement of one of said parts relatively to another. The said bolts are arranged in pairs and their heads are apertured to provide journal-bearings to receive pintles $j$, on which are journaled the hubs $k$ of elbow-levers having the short arms $k'$ and the long arms $k^2$. The short arms $k'$ bear against the ends of the studs $h$, as shown in Fig. 3, so that by rocking the said levers about the pintles $j$ the said studs may be forced inward against the pressure of the springs $f$ to contract the members $d$ and $e$ into tight frictional engagement with the member $c$. The studs $h$ are arranged at equal distances from each other and two or more may be employed, the mechanism which I have illustrated having four of them. The outer ends of the arms $k^2$ are connected by links $m$ with ears $n$ on a sleeve $n'$, loosely sliding on the shaft $b$. When the sleeve is slid into the position shown in Fig. 2, the elbow-levers are rocked to move the movable parts of the clutch into engagement with the non-sliding member. As soon as the sleeve $n'$ is moved to an inoperative position the springs $f$ separate the members $d$ and $e$, so as to move them entirely out of contact with the member $c$. The carrier $g$ sustains both the member $d$ and the member $e$, although it permits the latter to be moved toward and from each other.

Having thus explained the nature of the invention and described a way of constructing and using the same, although without attempting to set forth all of the forms in which it may be made or all of the modes of its use, I declare that what I claim is—

1. Friction clutch mechanism comprising a carrier having a cylindrical flange, pins projecting from the periphery of said flange, a friction-ring having a cylindrical flange overlapping said first-mentioned flange, slots in the flange of said ring coöperating with said pins in producing an axial sliding connection between said carrier and said friction-ring, studs extending through said carrier, and supported thereby, a friction-disk supported between said carrier and said friction-ring by said studs, said studs being fixed with relation to said friction-disk, springs interposed between said friction-ring and said friction-disk, a friction member between said friction-ring and said friction-disk, and operating-levers mounted on fulcra connected to said friction-ring, said levers having cams bearing against the projecting ends of said studs.

2. Friction clutch mechanism comprising a friction member, a carrier, a friction-ring overhanging said friction member means for slidably connecting said ring to the carrier, studs passing through said carrier, a friction-disk supported by said studs, bolts passed through all of said members and holding them loosely in relative position said bolts being connected to said ring, pintles mounted in the heads of said bolts, operating-levers supported by said pintles and having cams bearing against said studs, the latter being provided with shoulders bearing against said friction-disk, and means for holding all of said members normally out of engagement.

In testimony whereof I have affixed my signature in presence of two witnesses.

MALCOLM CAMPBELL.

Witnesses:
MARCUS B. MAY,
C. C. STECHER.